United States Patent
Degani et al.

(10) Patent No.: US 9,484,063 B2
(45) Date of Patent: Nov. 1, 2016

(54) SHARED SCENE MOSAIC GENERATION

(71) Applicant: Quadmanage Ltd., RaAnana (IL)

(72) Inventors: Yoav Degani, Tel-Aviv (IL); Shlomo Shor, Kfar-Saba (IL)

(73) Assignee: Quadmanage Ltd., RaAnana (IL)

( * ) Notice: Subject to any disclaimer, the term of this patent is extended or adjusted under 35 U.S.C. 154(b) by 0 days.

(21) Appl. No.: 14/044,021

(22) Filed: Oct. 2, 2013

(65) Prior Publication Data

US 2014/0093222 A1    Apr. 3, 2014

Related U.S. Application Data (60) Provisional application No. 61/708,679, filed on Oct. 2, 2012.

(51) Int. Cl.

| | | |
|---|---|---|
| *H04N 9/80* | (2006.01) | |
| *G11B 27/029* | (2006.01) | |
| *H04N 21/422* | (2011.01) | |
| *H04N 21/4227* | (2011.01) | |
| *H04N 21/45* | (2011.01) | |
| *H04N 21/80* | (2011.01) | |
| *H04N 21/60* | (2011.01) | |
| *G11B 27/031* | (2006.01) | |

(52) U.S. Cl.
CPC ........... *G11B 27/029* (2013.01); *G11B 27/031* (2013.01); *H04N 21/4227* (2013.01); *H04N 21/42204* (2013.01); *H04N 21/45* (2013.01); *H04N 21/60* (2013.01); *H04N 21/80* (2013.01)

(58) Field of Classification Search
CPC .................. H04N 21/42204; H04N 21/4227; H04N 21/45; H04N 21/60; H04N 21/80
USPC .......................... 386/240, 285, 241, 248, 262
See application file for complete search history.

(56) References Cited

U.S. PATENT DOCUMENTS

| | | | | |
|---|---|---|---|---|
| 8,046,798 | B1* | 10/2011 | Schlack | G06Q 30/02 725/10 |
| 8,830,243 | B2* | 9/2014 | Lee et al. | 345/473 |
| 8,839,290 | B2* | 9/2014 | Roberts | H04N 5/44543 725/132 |
| 9,326,047 | B2* | 4/2016 | Brockmann | H04N 21/482 |
| 2002/0120931 | A1* | 8/2002 | Huber | H04N 7/17318 725/34 |
| 2003/0009371 | A1* | 1/2003 | Gauba | G06Q 30/02 725/34 |
| 2007/0250901 | A1* | 10/2007 | McIntire et al. | 725/146 |
| 2008/0040380 | A1* | 2/2008 | Miyaki | 707/102 |
| 2008/0222673 | A1* | 9/2008 | Durden | H04N 7/163 725/25 |
| 2010/0153848 | A1* | 6/2010 | Saha | 715/721 |
| 2011/0107215 | A1* | 5/2011 | Klappert | 715/716 |
| 2011/0161409 | A1* | 6/2011 | Nair | G06F 8/38 709/203 |
| 2012/0057851 | A1* | 3/2012 | Yoshimine | G11B 27/034 386/278 |
| 2013/0339433 | A1* | 12/2013 | Li | G06K 9/00 709/204 |
| 2013/0343729 | A1* | 12/2013 | Rav-Acha et al. | 386/285 |

\* cited by examiner

*Primary Examiner* — Helen Shibru (57) ABSTRACT

A method of joint generation of a mosaic of scenes. The method comprises selecting by each of a plurality of users one of a plurality of characters which are imaged in a plurality of media content items, alternately selecting by the plurality of users a plurality of expression indications, each the expression indication is selected during another of a plurality of user interactions which are held alternately with the plurality of users using a plurality of client terminals, sequentially selecting a plurality of scenes which are extracted from the plurality of media content items, each the scene is selected in another of the plurality of user interactions according to a respective the expression indication and images a respective character from the plurality of characters, and automatically generating a scene mosaic which comprises the plurality of scenes.

13 Claims, 4 Drawing Sheets

SHARED SCENE MOSAIC GENERATION

RELATED APPLICATION

This application claims the benefit of priority under 35 USC §119(e) of U.S. Provisional Patent Application No. 61/708,679 filed Oct. 2, 2012.

BACKGROUND

The present invention, in some embodiments thereof, relates to content generation and, more specifically, but not exclusively, to methods and systems for shared video clip generation.

The power of users playing the roles of authors and editors is substantially increases. Internet and cellular communication enabling users to become active in content production and sharing and to co-create user generated content. Various networked applications are used to create and share non-programmable media content. For example, platforms such as YouTube and Flicker are commonly used. In these platforms users get different types of feedback from other members of the community and find inspirational ideas by looking at other people's creations. Other commonly used platforms for sharing user generated content are social networks, blogs, instant messaging, and/or the like.

In today's digital era, there are new factors at play that force many people to become multitaskers more than ever. Such situation creates the "fear of missing out (FOMO) addiction", briefly a fear of missing out on something or someone more interesting, exciting or better than what we're currently doing. Texting while driving, checking Twitter stream or Facebook news feed while on a date, etc. This pattern of behavior leads users to use their mobility devices while watching television and/or for watching television. According to a survey presented during Mashable Media summit 2011, 70% of mobility devices (e.g. tablet and Smartphone) owners use mobility devices while watching TV.

SUMMARY

According to some embodiments of the present invention, there is provided a method of joint generation of a mosaic of scenes. The method comprises selecting by each of a plurality of users one of a plurality of characters which are imaged in a plurality of media content items, alternately selecting by the plurality of users a plurality of expression indications, each expression indication is selected during another of a plurality of user interactions which are held alternately with the plurality of users using a plurality of client terminals, sequentially selecting a plurality of scenes which are extracted from the plurality of media content items, each scene is selected in another of the plurality of user interactions according to a respective the expression indication and images a respective character from the plurality of characters, and automatically generating a scene mosaic which comprises the plurality of scenes.

Optionally, the method comprises selecting the plurality of expression indications in at least one of the plurality of user interactions according to a scene selected in a previous user interaction from the plurality of user interactions.

Optionally, the plurality of expression indications are presented as a palette of emoticons in the plurality of client terminals.

Optionally, the plurality of expression indications are presented as a list of textual strings in the plurality of client terminals.

Optionally, the mosaic is a video clip.

Optionally, the mosaic is an audio clip.

Optionally, the method comprises posting the mosaic on at least one social network page of at least one of the plurality of users.

Optionally, the sequentially selecting comprises sequentially presenting the plurality of scenes so that a scene selected according to one of the expression indications which is provided by a first of the plurality of users is not presented thereto before the scene mosaic is generated.

Optionally, the plurality of media content items are episodes of a plurality of TV series.

Optionally, the plurality of scenes are selected from different media content items of the plurality of media content items.

According to some embodiments of the present invention, there is provided a system of joint generation of a mosaic of scenes. The system comprises a repository which hosts a plurality of scenes from a plurality of media content items, a plurality of client modules which are installed in a plurality of client terminals and allows a plurality of users to select separately a plurality of characters which are imaged in the plurality of media content items and to select an expression indication from a plurality of expression indications which are presented thereto during one of a plurality of user interactions which are held alternately with the plurality of users using the plurality of client terminals, a management module which is installed in a central unit and manages the plurality of user interactions and sequentially selects a plurality of scenes which are extracted from the selected plurality of media content items, each scene is selected according to a respective the expression indication and images a respective character from the plurality of characters, and a mosaic generation module which automatically generates a scene mosaic which comprises the plurality of scenes.

Optionally, the plurality of client terminals comprises a plurality of cellular devices which communicates with the central unit over a cellular network.

According to some embodiments of the present invention, there is provided a method of joint generation of a mosaic of scenes. The method comprises a) presenting a plurality of expression indications on a display of a first client terminal associated with a first user, b) selecting by the first user at the first client terminal one of the plurality of expression indications, c) selecting by the first user at the first client terminal at least one character image in at least one media content item, d) sending the selected expression indication to a central unit which matches a scene from the at least one media content to the selected expression indication and forwards the matched scene to a second client terminal associated with a second user, e) receiving in continuation to the expression indication selection a message with a continuing scene from the central unit and presenting the continuing scene on the first client terminal, f) iteratively repeating a)-e) to create a scene mosaic of a plurality of different scenes which are of alternately selected according to a plurality of expression indications selected in the first and second client terminals and g) presenting the scene mosaic.

Optionally, the presenting comprises stitching the plurality of different scenes to a sequence wherein the plurality of different scenes are sequentially presented.

Optionally, each scene is selected according to the relatedness thereof to at least one previously selected scene of the plurality of scenes.

More optionally, the relatedness is determined using a scene relation dataset that maps a plurality of possible connections between a plurality of pairs of the plurality of scenes.

More optionally, the plurality of possible connections are weighted.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to content generation and, more specifically, but not exclusively, to methods and systems for shared video clip generation.

According to some embodiments of the present invention, there are provided methods and systems of joint generation of a mosaic of scenes during a session with a plurality of alternating user iterations, for example during a game session, according to some embodiments of the present invention. The scenes are sequentially added to a mosaic (or selected to be added) according to expression indications, such as graphical symbols, for example emoticons, and textual strings, which are sequentially selected by different users. For example, a user is presented with palette of emoticons and selects one or more of them, for example in response to a scene he watched and/or a message or idea he wants to convey. The selected graphical symbols are matched with a scene, for example according to metadata of various scene entries. The selected scene is forwarded to be presented to other user(s) which respond to the presentation thereof with an expression indication selection to induce the addition of a continuing scene to the mosaic. The systems and methods allow generating a mosaic, such as a video clip, wherein characters of different media content items, for example different TV series, participate in a dialogue having a certain meaning, for example entertaining significance. Optionally, during each user iteration, a user selects one or more expression indications from a dynamically generated set of expression indications. This set is optionally dynamically generated and/or adjusted according to availability of scenes having a relation one or more scenes which have been previously selected for the mosaic. Optionally, the mosaic is generated so that the first time a user is presented with scenes selected according to his inputs is when the session ends the mosaic generation is completed.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, for example Objective-C language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, a cloud, other programmable data processing apparatus, or other devices to function in a particular manner, for example Smartphones and tablets, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
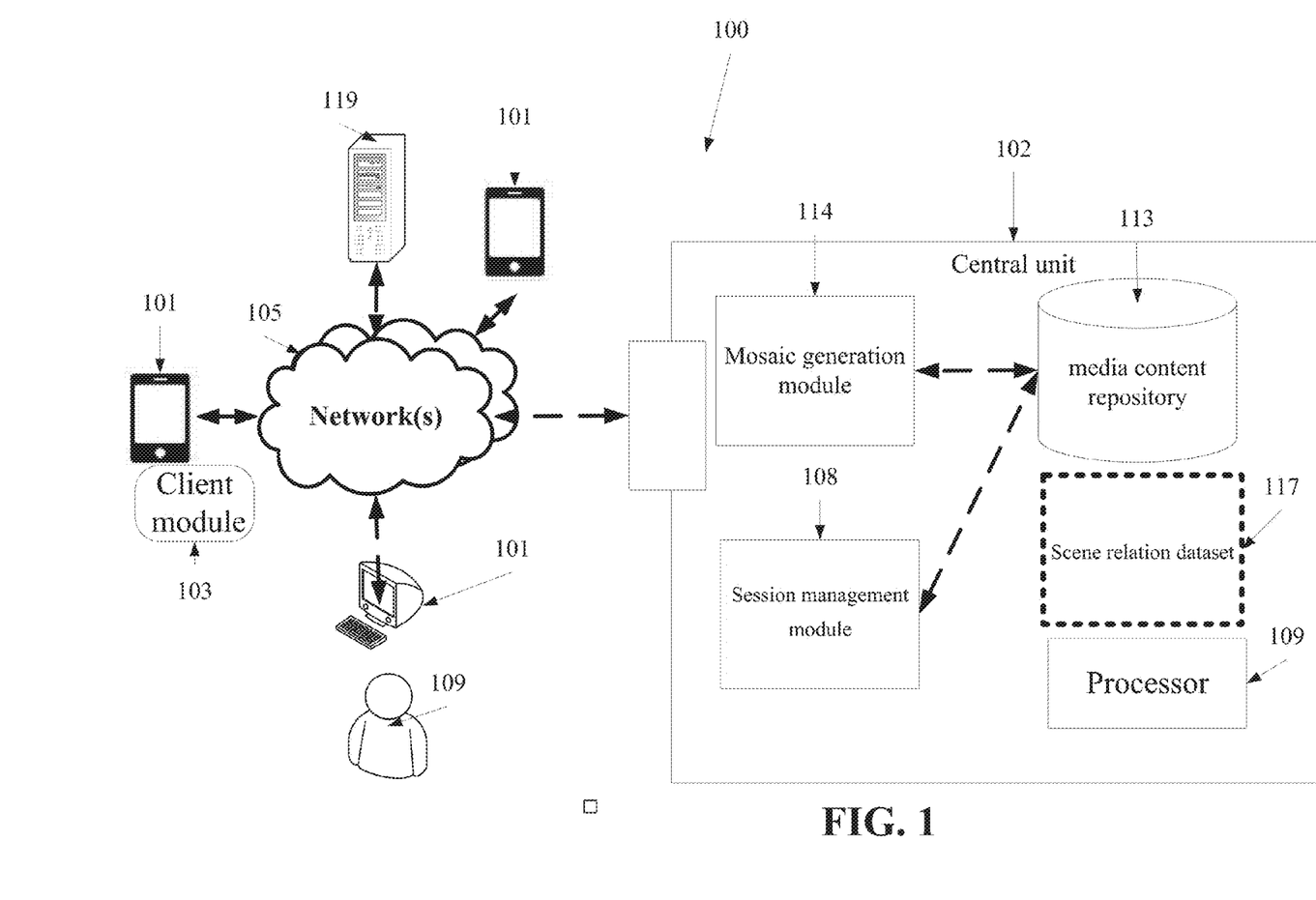
FIG. 1 is a schematic illustration of a plurality of client terminals which communicate with a central unit 102 over one or more networks for jointly assembling a mosaic of scenes in an interactive multi-participant process, according to some embodiments of the present invention.

Reference is now made to FIG. 1, which is a schematic illustration of a plurality of client terminals 101 which communicate with a central unit 102 over one or more networks 105 for jointly assembling a mosaic of scenes in an interactive multi-participant process, for example a sequence, according to some embodiments of the present invention. As used herein, a media content item means video and/or audio file and/or stream, a reference to the file or stream, any other multimedia file and/or the like. The media content item includes content taken from a scene of an episode of a media content collection, such as a television (TV) series and/or an advertisement, a scene taken from a movie and/or an advertisement and/or an imitating of such scenes. The networks 105 may include the internet, a cellular network, a local area network (LAN), a wireless local area network (WLAN), and/or the like.

The client terminals 101 may be processor based optionally mobile devices, for example network nodes, optionally handheld, for example Smartphones, tablets, desktops, laptops, augmented reality devices, and/or the like. The central unit 102 may be implemented by a server, a plurality of servers, and/or network nodes. The central unit 102 may be implemented by the client terminals 101.

The system 100 allows users, such as 109, who participate in a mosaic generation session, for example a game session, to generate jointly a mosaic of scenes taken from selected (i.e. favorite) media content collections and/or media content items and featured with selected characters, of these selected media content collections and/or media content items. The scenes of the scene mosaic are optionally selected according to user selections and/or preferences, optionally from a selected and/or preferred media content, for example according to a expression indication from a set of expression indications, such as a palette of graphical symbols, for example emoticons as shown at FIG. 3C, and/or textual strings which are presented to participants of the mosaic generation session. Before the scene mosaic is completed, each selected scene is optionally presented only to users other than the user who selected an expression indication according to which the scene was selected.

The client terminal 101 is set to host a client module, for example as shown at 103, for example an application from an application store (e.g. App Store™ and Google Play™) and/or a widget and/or an object application that is hosted on a browser running on the client terminal 101. The client module 103 allows a user to select media content collection and/or item for example to select a TV series and/or a movie and optionally one or more characters imaged in the selected media content collection and/or item, for example one or more figures. The client module 103 allows the user to indicate a feeling, a gesture, an expression, an action, and/or a reaction, for example by presenting thereto a set of expression indications, such as a palette of graphical symbols, for example emoticons, for instance as presented below and outlined above and/or a list of predefined text string messages. Each text string message is optionally associated with scenes wherein a selected character expresses the text string, for example in speech, by a gesture, and/or a facial expression. When a text string message are selected, matched scenes form a scene mosaic, such as a video clip wherein a dialogue or a monologue (i.e. both sides select the same character).

The system 100 is optionally a platform where the client terminals 101 execute as application on mobile device (Smartphone or tablet) and connected to a cloud server. The central unit 102 optionally includes a session management module 112 which manages the flow of a plurality of mosaic generation sessions, for example game sessions, between groups of two or more users which use two or more of the client modules 103. The session management module 112 optionally receive and process data from the client modules 103 and manages communication with a media content repository 113 which hosts a plurality of scene entries from a plurality of media content items, such as TV episodes and/or movies optionally at least some for a plurality of media content collections, such as TV series. The media content repository 113 is optionally a cloud base storage accessed via web service(s). Each scene entry in the media content repository 113 contains an actual reference to a scene, for example a uniform resource locator (URL) and metadata that is set to be matched with user selection(s) and/or optional preference(s). For example, the metadata includes characters featuring in the scene and a descriptive graphical symbol and optionally one or more scene occurrence descriptors, such as keyword. For instance, a scene wherein a character that falls on the floor is associated with metadata of a picture or a graphics file of a falling avatar and optionally with descriptive words such as falling, failure, and/or floor.

The central unit 102, which is based on a processor 109 for calculations, optionally includes a scene mosaic generation module 114 that assembles a plurality of media scenes which are matched according to user selections, for example as described below and outlined above. The scene mosaic generation module 114 may be responsible for creating the scene mosaic (e.g. a video clip) that is presented to participants at the end of a mosaic generation session, for example a game session. The scene mosaic generation module 114 optionally sequentially appends scenes when selected. Alternatively, all the scenes are appended at the end of the session. Optionally, the scene mosaic generation module 114 forwards the scene mosaic to client modules 101 and/or a storage, optionally an external storage 119.

Optionally, a scene relation dataset 117, for example a matrix, is used to index relations among all available scenes, for example from different media content items and/or different media content collections. For example, the scene relation dataset 117 is a relational representation, for example a directed graph connecting all possible pairs of scenes and weight each relation according to the relatedness thereof. Each entry includes a scene identifier, for example a reference, and least of connected scenes, optionally with connection weights. The weights may be dynamically decided according to user feedback, user manual selection, metadata analysis (e.g. from the scene entries) and/or the like.

Figure 2:
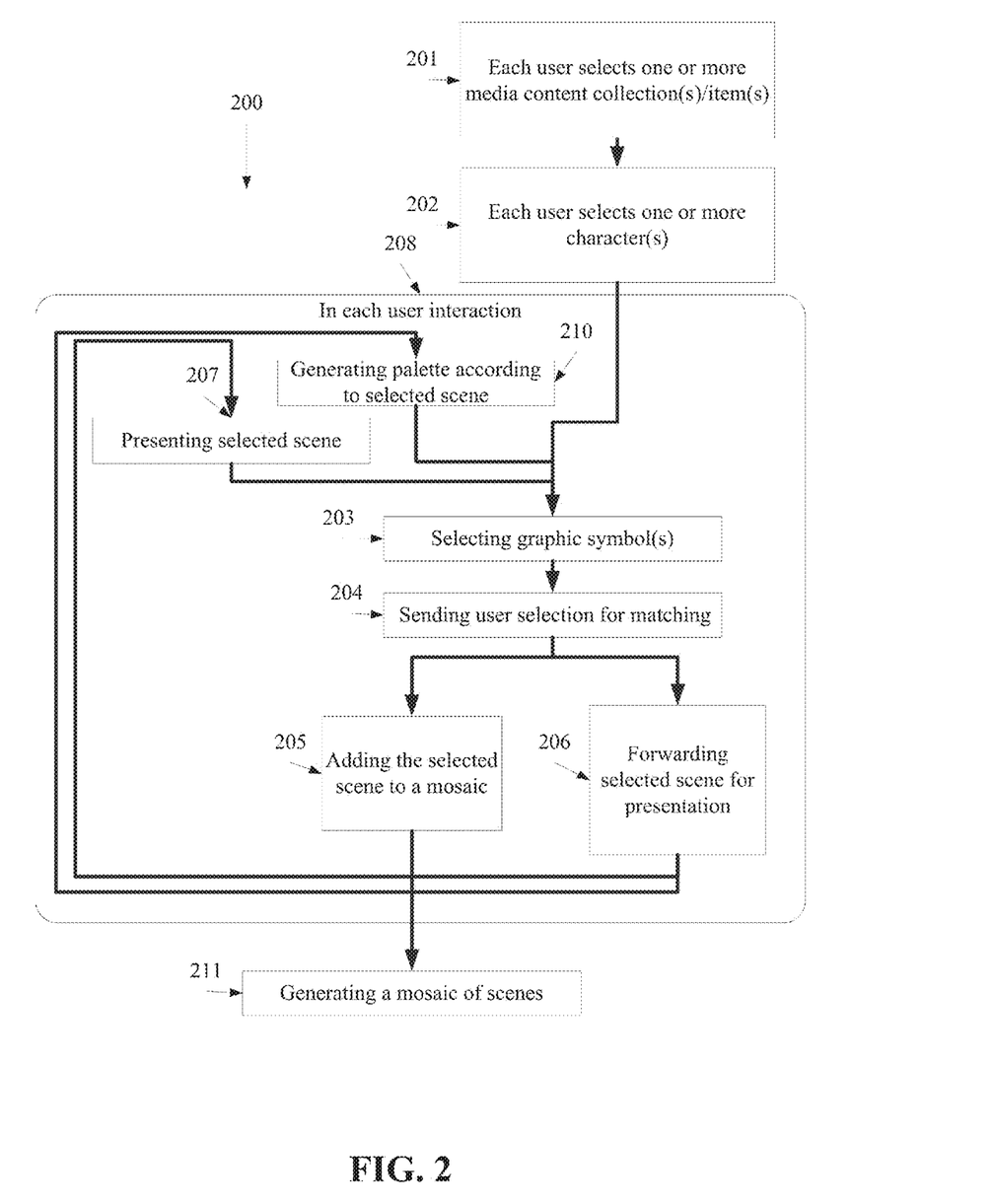
FIG. 2 is a flowchart of joint generation of a mosaic of scenes, for example using the system, during a the mosaic generation session, according to some embodiments of the present invention.

Reference is also made to FIG. 2, which is a flowchart 200 of joint generation of a mosaic of scenes, for example using the system 100, during a the mosaic generation session, according to some embodiments of the present invention.

The mosaic generation session is optionally game session that is established between users of the client terminals 101. For example, a game session is established when a user initiates one using a game graphical user interface (GUI) that is generated by the respective client module 103. Optionally, the user selects one or more peers he wants to add to the game session, for example social network friends, game friends, highly ranked gamers and/or the like. The flow of a game session may be based on an idea of jointly generating a mosaic of scenes, such as a video clip, where users, also referred to herein as participants or players, take turns to give an indication for automatic selection of scene, which is then presented to another player who then takes his turn to continue the video clip by giving an indication for the selection of a continuing scene. This allows creating a short movie from variety of scenes. It should be noted that thought the description exemplifies the method 200 and system 100 using an example of creating a visual scene mosaic from video files or video file segments of scenes, the method 200 and system 100 may be used for creating an audible mosaic of scenes represented by audio files taken from media content item, such as a soundtrack of a multimedia and/or audible content.

As shown at 201, each user that is associated with one of the client terminals 101 and participates in the mosaic generation session selects one or more characters which are imaged in one or more media content collection(s) and/or item(s). For example, each user chooses one or more favorite TV shows and/or movies and/or collection of movies, such as sequels, from a given selection. The selection is optionally presented as a list of textual strings and/or a palette of icons. Then, the user selects one or more characters from the selected shows. Optionally, the character(s) are selected from a list of textual strings and/or a palette that is automatically generated based on the more media content collection(s) and/or item(s) selection.

Now, as shown at 202, after each user selects character(s), an iterative process of a plurality of user interactions, which are held alternately among the users, is initiated to build up the mosaic of scenes wherein different user selected characters from one or more media content items are imaged, optionally in an order reflecting a certain level of reciprocation and/or characters' communication.

As shown at 203, during each user iteration, one of the users selects one or more expression indications, such as graphical symbols, referred to herein for brevity as an expression indication. For example, an expression indication, such as an emoticon, is selected from a palette that is presented thereto on his client terminal 101 and/or a textual string from a list of textual strings. The palette and/or the list of textual strings are generated to correspond with scenes from the media content the user selected which are available in the media content repository 113. For example, metadata associated with the scenes of the selected media content (e.g. metadata from the described below scene entries) is analyzed to extract expression indications, such as graphical symbols for the palette or text strings for the list of textual strings and/or references to such for the palette.

Once a user completes his selection, as shown at 204, a message with the user selection is sent to the session management module 112 that matches the selected expression indication with a scene from the media content repository 113, for example based on a match with the respective metadata of scene entries. As shown in 205, the matched scene, also referred to as the selected scene, is forwarded to the scene mosaic generation module 114 that adds it to the built up mosaic of scenes. As shown in 206, the matched scene is sent for presentation to another user. As shown at 207, the matched scene is presented to the other user and during another user interaction that is initiated with this presentation. As shown at 208, 207 and 203-206 are repeated sequentially in different user interactions with different users, adding scenes to the scene mosaic until it is completed. Optionally, the number of user iterations per player is set in advance, either by the user, for example using the above GUI preset automatically, for example 5 user interactions per user wherein 5 scenes are selected according to the user inputs, and/or set automatically based on the availability of scenes.

Optionally, the mosaic generation session is held between socially connected users. In such an embodiment, a scene selected as described above may be posted as part of an invitation to join the mosaic generation session in the social network page of the user who selected a respective expression indication. In this embodiment, the one or more other users in the session are socially connected users who accepted this invitation.

As described above and depicted in 203, during each one of the user iterations, one of the players selects an expression indication, for example a graphical symbol, such as an emoticon, from a palette that is presented thereto on his client terminal 101. Optionally, as shown at 210, during each user iteration (optionally apart from the first and last iterations) the palette is generated according to the last selected scene, for example using the scene relation dataset 117. For example, only scenes, which are connected to the selected scene with a connection having a weight above a certain threshold, are selected. Optionally, the palette is generated to include expression indications which are associated with one or more of the previously selected scenes, for example by identifying scenes which are connected to all the previously selected scenes and/or to most of the previously selected scenes and/or to at least a certain percentage of the selected scenes. Optionally, the palette is generated according previous user selection.

As shown at 211, a scene mosaic is generated by stitching all the selected scenes in their selection order is generated and outputted, for example to a storage location and/or sent to all users, for example streamed. Optionally the stitching includes automatic editing of the scenes, for example adding dissolving effects and/or the like. Optionally, a link to a file that comprises the scene mosaic is sent to all players. Optionally, the scene mosaic is made available to social network friends of the participating players, for example posted on their wall in Facebook™, twitted as a URL and/or the like.

In this process, the scenes which are extracted from the repository are automatically and sequentially selected in response to expression indications, such as graphical symbols and/or textual strings, selected by users. Optionally, only the user that is about to select an expression indication is presented with the last selected scene so that all the scenes in the outcome scene mosaics are seen at the first time to all users only when the mosaic generation session ends.

Figure 3A:
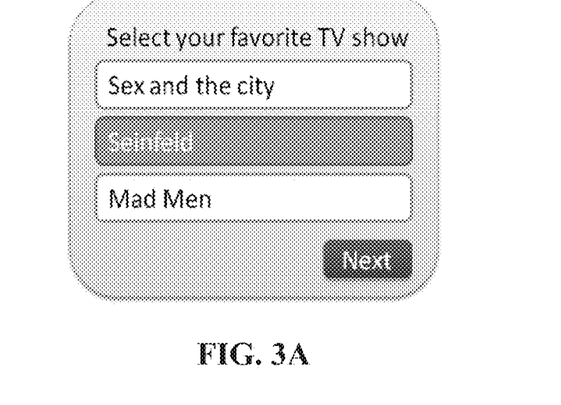
FIGS. 3A-3B are images of exemplary graphical user interface windows for allowing a user to make selections, according to some embodiments of the present invention.
Figure 3B:
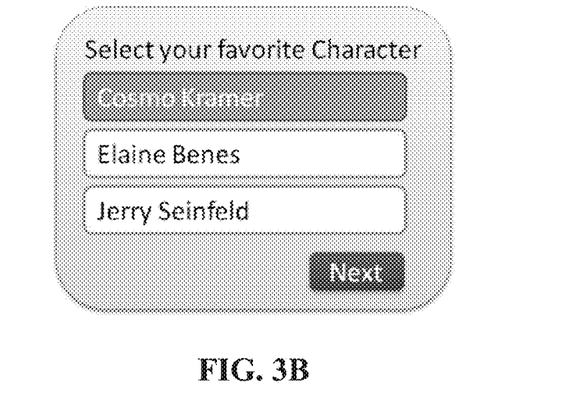
Figure 3C:
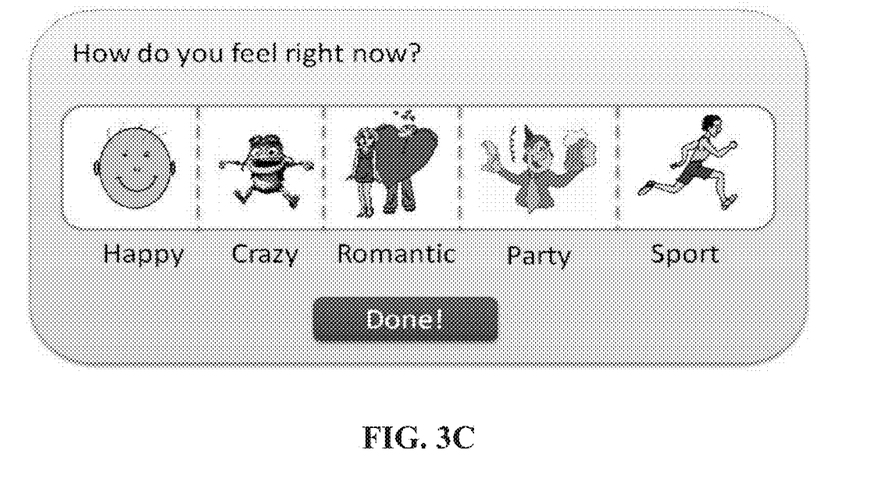
FIG. 3C depicts a palette of graphical symbols, according to some embodiments of the present invention.
Figure 4:
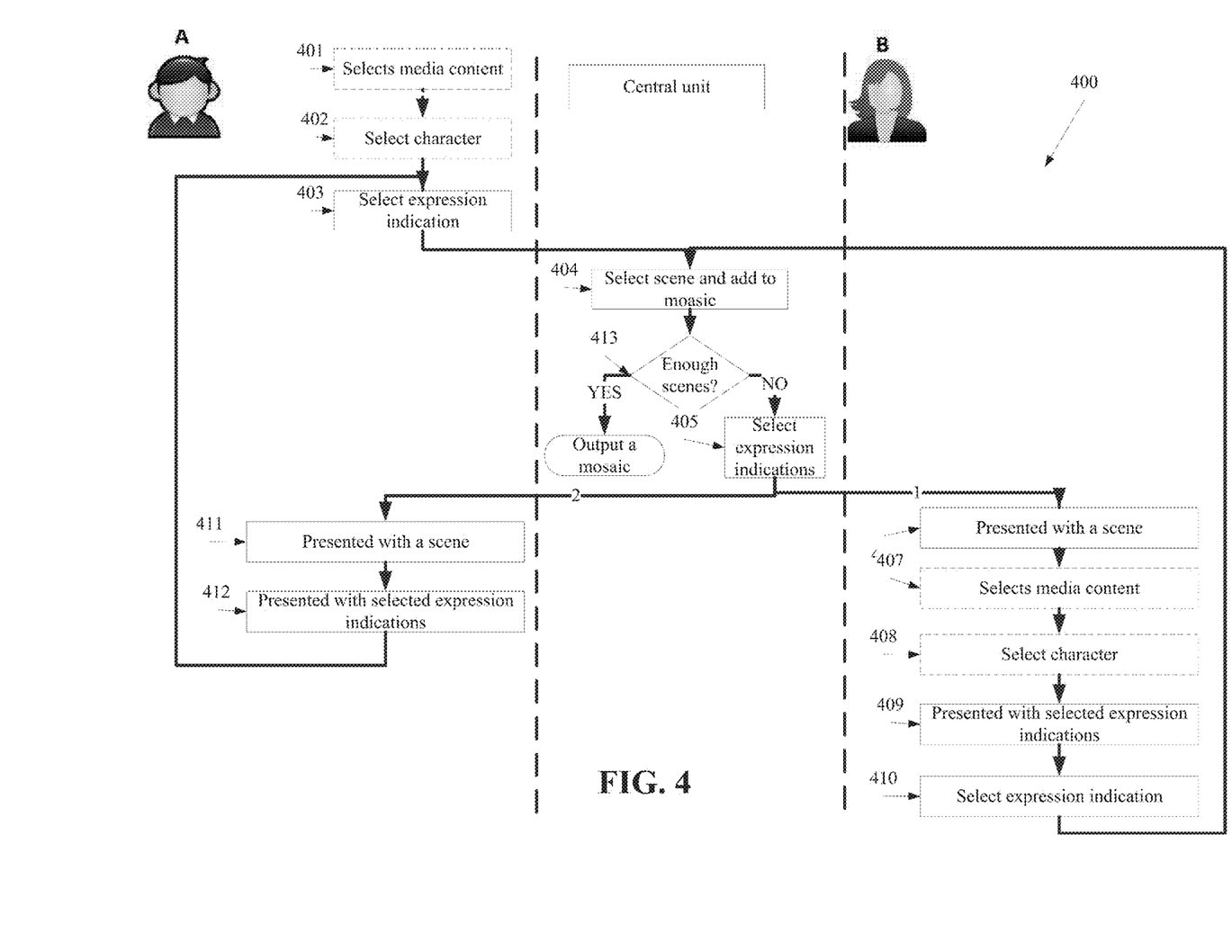
FIG. 4 is a circular flowchart of an exemplary mosaic generation session between two players using exemplary GUIs, for example as described in FIGS. 3A-3C, according to some embodiments of the present invention.

Reference is now made to FIG. 4, which is a circular flowchart 400 of an exemplary mosaic generation session between two players (A and B) using exemplary GUIs, for example as described in FIGS. 3A-3C, according to some embodiment of the present invention. For clarity broken lines indicates actions performed in the first iteration of player A or B and a continuous line is indicative of an action that is performed in each all user interactions.

First, one of the players, referred to herein as the player A, initiates a game session and optionally an initiation message is sent to the session management module 112 with the identification of the player A (not shown). The session management module 112 may use this identification for identifying potential co players and optionally to invite them to the game session, for example player B (not shown).

Now, as shown at 401, the player A selects a media content collection and/or item, for example a favorite TV show, from a list of textual strings representing the selection in the media content repository 113, for example as shown at FIG. 3A. Then, as shown at 402, the player A selects a character, for example his favorite character, from the selected favorite TV shown above. The selection may be made from a list of textual strings that is presented to the player, for example see FIG. 3B.

Now, as shown at 403, the session management module 112 optionally selects a set of expression indications to present to the player A. This selection is adapted to the available scenes of the selected media content. The selected expression indication and an identifier of the character and optionally the selected media content are forwarded to the central unit.

Based on the player selection, the central unit selects a scene from the media content repository 113, for example as described above and depicted in 404. Scenes are selected and added to the mosaic (or set to be added to the mosaic) as long as the number of scene selected in this session equals to a certain threshold, as shown at 413.

Optionally, one or more content providers may use an interface, such as an application using a designated application program interface (API) to update the media content repository 113 and/or to adjust a ranking given to different scenes. In such a manner, some scenes and/or characters may be promoted over the others. For example, the scene may be selected from future episodes, used as trailers for promoting the media content. By using such an API, the content provider influences scene selection.

Optionally, the central unit 102 runs one or more agents which participate in a mosaic generation session as a player. In such embodiments, the scenes may be selected from content which a content provider wishes to promote.

Now, as shown at 405, a set of optional expression indications is optionally selected based the selected scene, for example as described above. In some embodiments, the set of optional expression indications is generated from expression indications which are associated with scenes which are related to one or more previously selected scenes. For instance, a set of optional expression indications, for example graphical symbols, is derived from the relations between a previously selected scene and other scenes which are available in the repository 113, for example based on connections documented in the scene relation dataset 117, for example as described above. For instance, if player A selected "Happy" expression indication, the session management module 112 identifies expression indications which are related to happiness. This relatedness may be identified using the metadata of scene entries in the media content repository 113 and/or the scene relation dataset 117. The selection based on relatedness defined by the scene relation dataset 117 increases the probability that the scenes in the generated scene mosaic are played in a logical order and suitable to the theme imagined the players, for instance more related to what the player feel during the game.

Now, second user iteration is initiated and player B receives invitation for playing the game with the player A (not shown). As shown at 406, player B is provided with access to the selected scene, for example a URL and/or a stream and instructed to perform his selection accordingly. As shown at 407, 408 and similarly to 401, 402, player B selects media content and a character. As shown at 409, the selected expression indications are presented thereto, for example as graphical symbols in the palette. These expression indications are optionally adapted to continue the scene that is presented thereto, for example based on relatedness as described above. Optionally, player B may decide to select expression indication(s) without watching the scene selected by the player A, see 410. Similarly to 403, this user selection is sent to the central unit which as described above. Now, a third user interaction is initiated with the player A. The central unit, as depicted in 404 and 405, selects a new scene according to the selected expression indication(s) and optionally a new set of optional expression indications for presentation to player A, see 411 and 412. As shown at 413, 403-406 and 409-412 may be processed iteratively as long as the number of selected scenes is lower than a certain number and/or until one of the users instructed ending this session, for example using a user interface and/or a GUI.

Similarly to the described above, in each iteration a scene is selected according to one or more expression indications selected by one player and sent to be viewed by another player.

It should be noted that thought the description exemplifies some embodiments based on a mosaic generation session with two participants, any number of participants may participate in the mosaic generation session, for example 3, 5, 8, 12, 50 or any intermediate or larger number. Optionally, in a session with more than 2 players each player can see the selection made by the previous player in line and its own chosen scene. The central unit 102 may choose how many rounds are needed to make the mosaic. In these embodiments the engagement of players is increased as the time between user iterations of a certain player increases.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and system will be developed and the scope of the term a processor, a module, a unit, and a network node is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of joint generation of a mosaic of scenes, comprising:

managing a multi-user mosaic joint generation session participated by a plurality of users by updating a graphical user interface (GUI) in a plurality of client terminals;

receiving from each of said plurality of users a character selection made using a respective said GUI, said character selection is indicative of one of a plurality of characters which are imaged in a plurality of media content items, said plurality of media content items is mapped in a scene relation dataset mapping a plurality of possible connections between a plurality of pairs of said plurality of media content items, each of said plurality of possible connections is weighted;

sequentially managing a plurality of iterations of user interactions held alternately among said plurality of users such that during each said user interaction iteration one of a plurality of expression indications is selected using a respective said GUI and one of said plurality of media content items is selected according to a relatedness to at least one previously selected one of said plurality of media content items, said relatedness determined using said scene relation dataset mapping, to represent said selected expression indication, said selected media content item images a scene with a respective selected character from said plurality of characters; and automatically generating a scene mosaic by stitching said selected media content items of said plurality of media content items into a sequence sequentially presenting a plurality of scenes imaged in said selected media content items.

2. The method of claim 1, further comprising selecting said plurality of expression indications in at least one of said plurality of user interactions according to a scene selected in a previous user interaction from said plurality of user interactions.

3. The method of claim 1, wherein said plurality of expression indications are presented as a palette of emoticons in said plurality of client terminals.

4. The method of claim 1, wherein said plurality of expression indications are presented as a list of textual strings in said plurality of client terminals.

5. The method of claim 1, wherein said mosaic is a video clip.

6. The method of claim 1, wherein said mosaic is an audio clip.

7. The method of claim 1, further comprising posting said mosaic on at least one social network page of at least one of said plurality of users.

8. The method of claim 1, further comprising in each one of said plurality of user interactions forwarding a scene from a respective selected said media content item to a first of said plurality of users before said scene mosaic is generated.

9. A computer readable medium comprising computer executable instructions adapted to perform the method of claim 1.

10. The method of claim 1, wherein said plurality of media content items are episodes of a plurality of TV series.

11. The method of claim 1, wherein said plurality of scenes are selected from different media content items of said plurality of media content items.

12. A system of joint generation of a mosaic of scenes, comprising:

a repository which hosts a plurality of media content items;

a plurality of client modules each executed by a hardware processor of one of a plurality of client terminals to present a graphical user interface (GUI) that receives from one of a plurality of users:

a character selection indicative of one of a plurality of characters which are imaged in said plurality of media content items, said plurality of media content items is mapped in a scene relation dataset mapping a plurality of possible connections between a plurality of pairs of said plurality of media content items, each of said plurality of possible connections is weighted, and an expression selection of at least one of a plurality of expression indications which are presented using said GUI;

at least one server adapted to execute the following code instructions:

code instructions for sequentially and managing a plurality of iterations of user interactions held alternately among said plurality of users such that during each said user interaction iteration one of a plurality of expression indications is selected using a respective said GUI and one of said plurality of media content items is selected according to a relatedness to least one previously selected one of said plurality of media content items, said relatedness determined using said scene relation dataset mapping, to represent said selected expression indication; and code instructions for automatically generating a scene mosaic by stitching said selected media content items of said plurality of media content items into a sequence sequentially presenting a plurality of scenes imaged in said selected media content items.

13. The system of claim 12, wherein said plurality of client terminals comprises a plurality of cellular devices which communicates with said at least one server over a cellular network.

* * * * *